United States Patent [19]

Yasuhara

[11] Patent Number: 4,491,143

[45] Date of Patent: Jan. 1, 1985

[54] FUEL SUPPLY SYSTEM FOR INTERNAL COMBUSTION ENGINES

[75] Inventor: Seishi Yasuhara, Yokosuka, Japan

[73] Assignee: Nissan Motor Company, Limited, Japan

[21] Appl. No.: 471,853

[22] Filed: Mar. 3, 1983

[30] Foreign Application Priority Data

Apr. 1, 1982 [JP] Japan .............................. 57-52279
May 24, 1982 [JP] Japan .............................. 57-74870

[51] Int. Cl.[3] .............................. B01D 17/02
[52] U.S. Cl. .............................. 137/172; 137/563; 123/198 DB; 210/167
[58] Field of Search .............................. 137/172, 173, 563, 192; 123/198 D, 198 DB; 210/167, 172

[56] References Cited

U.S. PATENT DOCUMENTS

| | | | |
|---|---|---|---|
| 2,295,097 | 9/1942 | Waugh | 137/172 X |
| 3,088,592 | 5/1963 | Clark | 137/172 X |
| 3,966,603 | 6/1976 | Grant | 137/172 X |
| 4,296,723 | 10/1981 | Aldrich | 123/510 |
| 4,328,825 | 5/1982 | Bishai | 137/172 |

FOREIGN PATENT DOCUMENTS 3000585 1/1980 Fed. Rep. of Germany .

*Primary Examiner*—Alan Cohan
*Attorney, Agent, or Firm*—Lowe, King, Price & Becker

[57] ABSTRACT

A fuel supply system including a fuel supply line extending from a fuel tank to a fuel supplier for delivery of fuel to an internal combustion engine. A water separator is positioned in the fuel supply line, the water separator having a chamber in which fuel and water are separated into a low phase comprising water and an upper phase comprising fuel. The water separator chamber has a first sensor for sensing a low level of water and a second sensor for sensing a high level of water. A control circuit is responsive to the first sensor for providing a warning indication urging a driver to drain the water in the water separator chamber when the water level in the water separator chamber increases to the low level. The control circuit is responsive to the second sensor for interrupting communication between the water separator and the fuel supplier when the water level in the water separator chamber increases to the high level.

16 Claims, 8 Drawing Figures

FUEL SUPPLY SYSTEM FOR INTERNAL COMBUSTION ENGINES

BACKGROUND OF THE INVENTION

This invention relates to a fuel supply system including a fuel supply line extending from a fuel tank to a fuel supplier for delivery of fuel to an internal combustion engine and, more particularly, to a fuel supply system including a water separator positioned in the fuel supply line, the water separator having a chamber in which fueld and water are separated into a lower phase comprising water and an upper phase comprising fuel.

If water exists in fuel for an internal combustion engine, corrosion may occur on engine cylinder wall and in the fuel supply circuit including a fuel tank and fuel lines and, particularly for a diesel engine, baking may occur on parts moving at high speeds in the fuel injection pump. As a result of the baking, the fuel injection pump do not function in the most efficient manner with its fuel injection performance spoiled to increase the tendency of engine stalling and sometimes cease to function at all.

The conventional practice is to provide a water separator in the fuel supply circuit, for example, upstream of the fuel injection pump for diesel engines, to remove water from fuel prior to delivery to the fuel injection pump. The water separator has a water separating chamber in which fuel and water are separated into an upper phase comprising fuel and a lower phase comprising water due to the difference between fuel and water densities. The water separating chamber has a water level sensor associated with an electric circuit to actuate a warning light to urge the driver to drain the water out of the chamber when a predetermined water level is reached.

One difficulty with such conventional water separators is the danger of damaging the fuel injection pump or other engine elements. If the driver leaves the water without draining it from the water separating chamber in spite of the warning indication or if a great amount of water, stored in the fuel tank, flows at one time into the water separating chamber for any of reasons, water will overflow and enter the fuel injection pump, with a resulting failure of the fuel injection pump.

The present invention provides a fuel supply system including a water separator positioned in a fuel supply line extending from a fuel tank to a fuel supplier for delivery of fuel to an internal combustion engine wherein a warning indication is made for urging a driver to drain the water in the water separator when the water level in the water separator increases to a first level before communication is interrupted between the water separator and the fuel supplier when the water level in the water separator increases to a second level higher than the first level.

SUMMARY OF THE INVENTION

There is provided, in accordance with the present invention, a fuel supply system including a fuel supply line extending from a fuel tank to a fuel supplier for delivery of fuel to an internal combustion engine, a fuel return line for returning superfluous fuel from the fuel supplier to the fuel tank, and a water separator positioned in the fuel supply line. The water separator having a chamber in which fuel and water are separated into a lower phase comprising water and an upper phase comprising fuel. The water separator chamber has a sensor for sensing a first level of water and a second level of water higher than the first water level. A control means is responsive to the sensor for providing a warning indication urging a driver to drain the water in the water separator chamber when the water level in the water separator chamber increases to the first level and for interrupting communication between the water separator and the fuel supplier when the water level in the water separator chamber increases to the second level.

The sensor includes magnetically response first and second reed switches located within the water separator chamber in vertical alignment with each other, and a magnetic float carried by the surface of the water in the water separator chamber. The first reed switch is closed by the magnetic float when the water level in the water separator chamber increases to the first level. The second reed switch is closed by the magnetic float when the water level in the water separator chamber increases to the second level.

Preferably, the control means is responsive to the sensor for providing communication between the fuel return line and the fuel supplier when the water level in the water separator chamber increases to the second level. The control means may include a drain valve which opens to drain the water in the water separator chamber when the water level in the water separator chamber increases to the second level.

DESCRIPTION OF THE PREFERRED EMBODIMENTS

Figure 1:
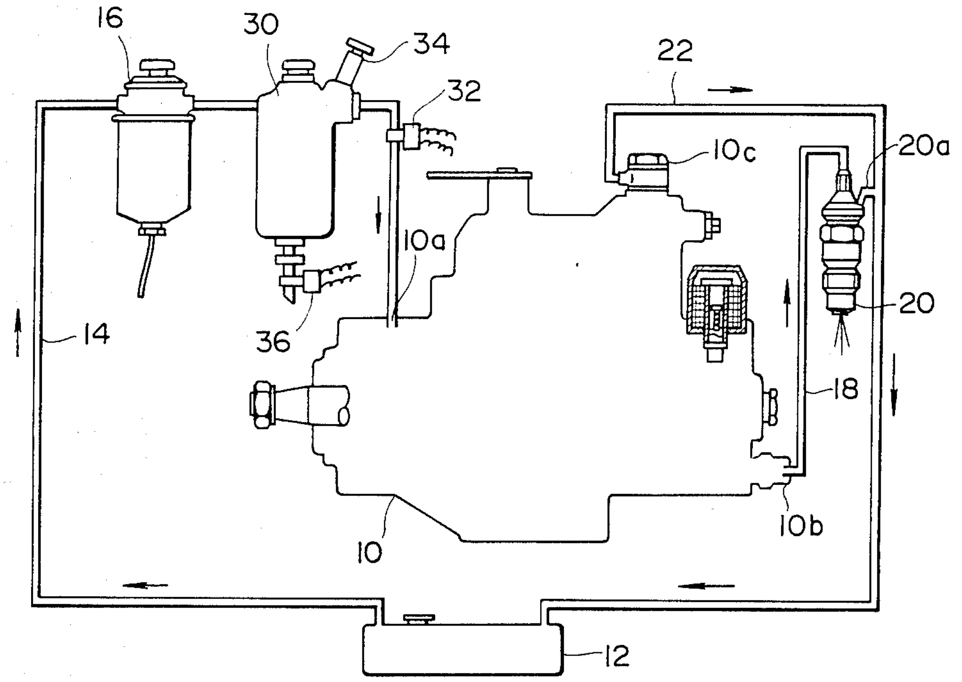
FIG. 1 is a schematic view showing one embodiment of a fuel supply system made in accordance with the present invention.

Referring now to FIG. 1, there is illustrated a fuel supply system including a fuel injection pump 10 for delivery of fuel to an internal combustion engine. The fuel injection pump 10 includes a feed pump which draws fuel through a pump inlet 10*a* into a pump housing from a fuel tank 12. The fuel tank 12 is connected to the pump inlet 10*a* through a fuel line 14 in which a fuel filter 16, a water separator 30 and a shut-off valve 32 are positioned in this order. The fuel filter 16 serves to prevent any contaminants from reaching the fuel injection pump. The fuel injection pump 10 also includes a plunger pump which delivers fuel under pressure from delivery valves 10*b* through supply lines 10 to fuel injectors, one of which is shown at 20, through which metered fuel is injected into individual cylinders of the engine. Superfluous fuel is discharged from a pump outlet 10*c* and returns to the fuel tank 12 through a return line 22 to which injector spill ports 20*a* are connected. The reference numeral 34 represents a manually-operated priming pump.

Figure 2:
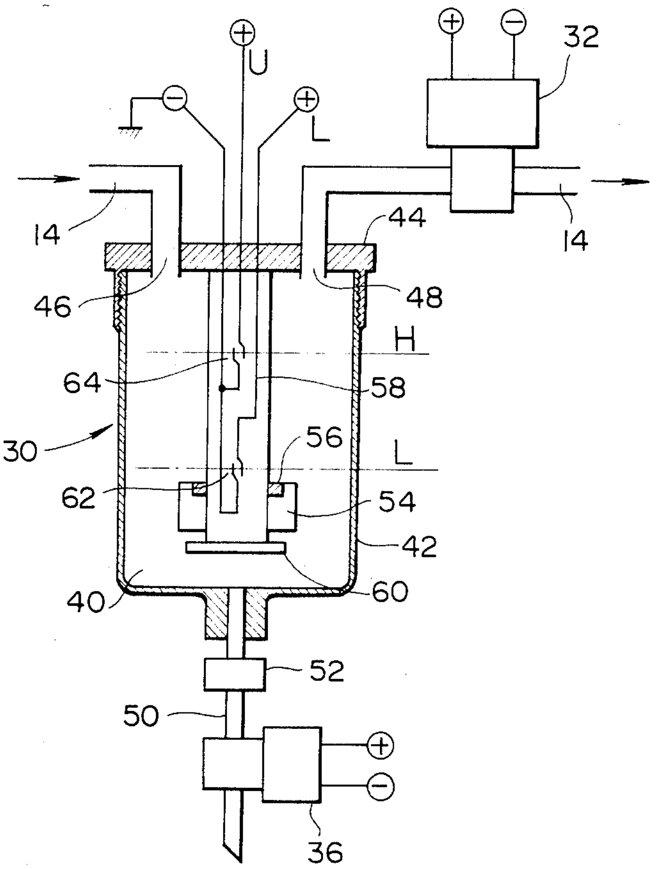
FIG. 2 is a sectional view showing the water separator included in the fuel supply system of FIG. 1.

Referring to FIG. 2, the water separator 30 includes a tank 42 with a cover 44 to define therein a water separating chamber 40. The cover 44 is formed with an inlet opening 46 connected to the fuel line 14 leading from the fuel filter 16 and an outlet opening 48 connected to the fuel line 14 in which the shut-off solenoid valve 32 is positioned. The tank 42 is formed in its bottom with a drain port from which a drain pipe 50 extends to the exterior. The drain pipe 50 has therein a drain solenoid valve 36. Rust powder or other cntaminants, produced in the fuel tank 12 and introduced with fuel into the water separating chamber 40, comes on the valve seat of the drain valve 36, spoiling the drain valve sealing effect. In order to prevent such contaminants from reaching the drain valve 36, a filter 52 is positioned in the drain pipe 50 upstream of the drain valve 36.

Fuel is introduced through the inlet opening 46 into the water separating chamber 40 and discharged therefrom through the outlet opening 48 to the fuel injection pump 10. With the introduction of fuel, water enters the water separating chamber 40 wherein fuel and water are separated into an upper phase comprising fuel and a lower phase comprising water due to the difference between fuel and water densities.

The water separating chamber 40 has a float 54 which floats up and down on the surface of water in the chamber 40 concentrically around a hollow guide tube 58 made of non-magnetic material. The density of the float 54 is less than the density of water and greater than the density of fuel. The guide tube 58 has on its lower end a stopper 60 which serves to prevent the float 54 from going below the level of the stopper. The float 54 has within it a permanent magnet 56 for actuation of lower and upper reed switches 62 and 64 within the hollow guide tube 58. The lower reed switch 62 is positioned so that when actuated by the magnet 56, it senses a low level position (L) of the water in the water separating chamber 40. The upper reed switch 64 is positioned so that when actuated by the magnet 56, it senses a high level position (H) of the water in the water separating chamber 40.

Figure 3:
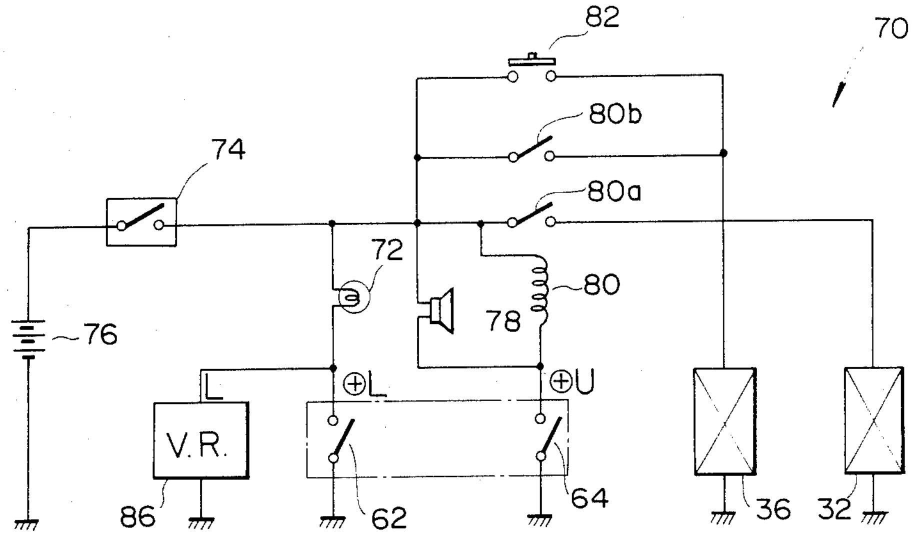
FIG. 3 is a circuit diagram showing a control circuit associated with the sensor located within the water separator of FIG. 2.

Referring to FIG. 3, the previously referred shut-off valve 32, drain valve 36, and lower and upper reed switches 62 and 64 are shown in a control circuit 70 with other circuit components. The lower reed switch 62 is connected at its negative terminal to ground and at its positive terminal to a warning light 72 which is in turn connected through a main switch 74 to a voltage source 76. The upper reed switch 64 has a negative terminal connected to ground and a positive terminal connected to a warning buzzer 78 which is in turn connected to the voltage source 76 through the main switch 74. The warning buzzer 78 is connected in parallel with a relay coil 80 which controls relay controlled switches 80*a* and 80*b*. When the relay coil 80 is energized, the switch contact 80*a* is closed to connect the shut-off valve 32 to the voltage source 76 through the main switch 74 and at the same time to switch contact 80*b* is closed to connect the drain valve 36 to the voltage source 76 through the main switch 74. A push button switch 82 is connected in parallel with the relay controlled switch 80*b* which is closed by the driver to connect the drain valve 36 to the voltage source 76 through the main switch 74. The reference numeral 86 indicates a voltage regulator whose lamp terminal is connected to the warning light 72. The voltage regulator 86 may be a normally used regulator which turns on a charge lamp, oil lamp, and other warning lamps for lamp checking during engine starting or before the car battery is charged.

The operation is as follows: Assuming now that the water level in the water separating chamber 40 is below the low level position, the lower and upper reed switches 62 and 64 are both open so that the warning light 72 and the warning buzzer 78 are held out of operation. Under this condition, the shut-off valve 32 is open and the drain valve 36 is closed.

When the water level in the water separating chamber 40 increases to the low level position, the float magnet 56 actuates and closes the lower reed switch 62 to actuate the warning light 72. The light indication is for urging the driver to drain the water from the water separating chamber 40 as spon as possible. The warning light 72 may be replaced with a warning buzzer or may be used together with a warning buzzer connected in parallel with the warning light 72. To drain the water from the water separating chamber 40, the driver may depress the push button 82 to connect the drain valve 36 to the voltage source 76, thereby opening the valve 36.

If the driver leaves the water in the water separating chamber 40 without draining it therefrom in spite of the warning indication or if a great amount of water, stored in the fuel tank 12, flows at one time into the water separating chamber 40, the water level in the water separating chamber 40 will further increases to the high level position. This causes the float magnet 56 to actuate and close the upper reed switch 62. This in turn energizes the relay coil 80 so as to close the relay controlled switches 80*a* and 80*b* and thereby connect the shut-off valve 32 and the drain valve 36 to the voltage source 76. Thus, the shut-off valve 32 closes to interrupt communication between the water separating chamber 40 and the fuel injection pump 10 and at the same time the drain valve 36 opens to drain the water through the drain pipe 50 from the water separating chamber 40. As a result of the closure of the shut-off valve 32, fuel delivery to the engine is terminated so that the engine ceases to rotate. Simultaneously with the energization of the relay coil 80, the warning buzzer 78 is actuated to provide a sound indication of this state of the fuel supply circuit.

When the water level in the water separating chamber 40 falls below the high level position due to this water draining, the upper reed switch 62 opens again to disable the warning buzzer 78 and deenergize the relay coil 80. As a result, the drain valve 36 closes while at the same time the shut-off valve 32 opens to restore the fuel delivery to the fuel injection pump 10 so as to resume engine rotation.

It will be appreciated that the control circuit 70 could easily be modified to open the drain valve 36 so as to drain the water in the water separating chamber 40 when the lower reed switch is closed by the magnetic float 54.

Figure 4:
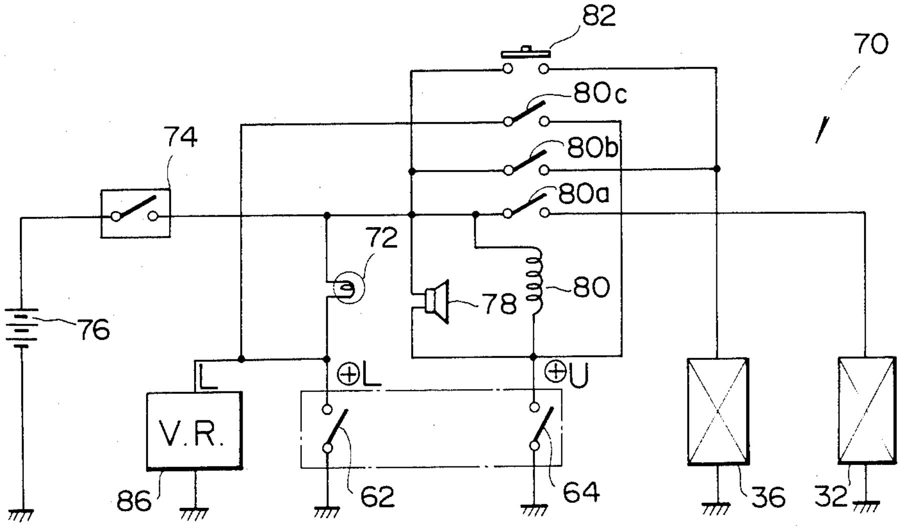
FIG. 4 is a circuit diagram showing a modified form of the control circuit of FIG. 3.

Referring to FIG. 4, there is illustrated a modified form of the control circuit 70 which is substantially similar to that of FIG. 3 except that the relay coil 80 controls an additional switch 80*c*. The relay controlled switch 80*c* is closed to connect the upper reed switch positive terminal to the voltage regulator 86 when the relay coil 80 is energized. Thus, the control circuit 70 of this form can hold the shut-off valve 32 closed and also the drain valve 36 open until the water level in the water separating chamber 40 falls below the low level position. It will be understood that the control circuit 70 may be arranged, with minor modifications, to open the shut-off valve 32 at the same time when the water level in the water separating chamber 40 falls below the high level position.

Figure 5:
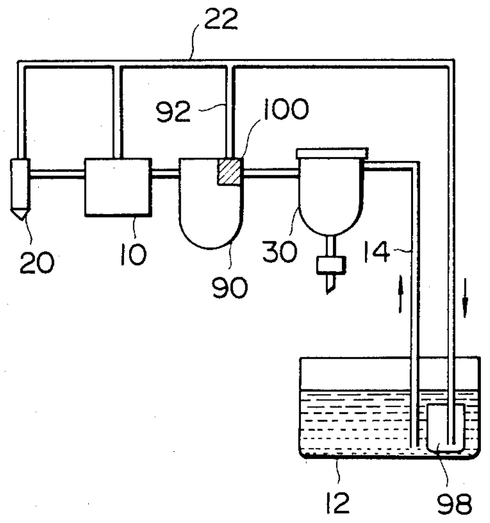
FIG. 5 is a schematic view showing another embodiment of the fuel supply system of the present invention.
Figure 6:
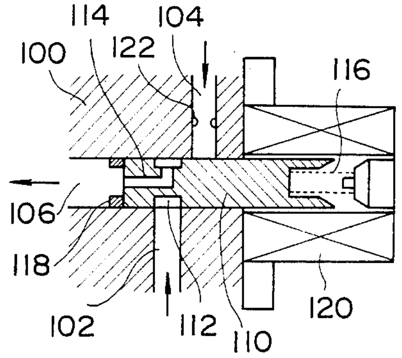
FIG. 6 is a sectional view showing the change-over valve included in the fuel supply system of FIG. 5.
Figure 7:
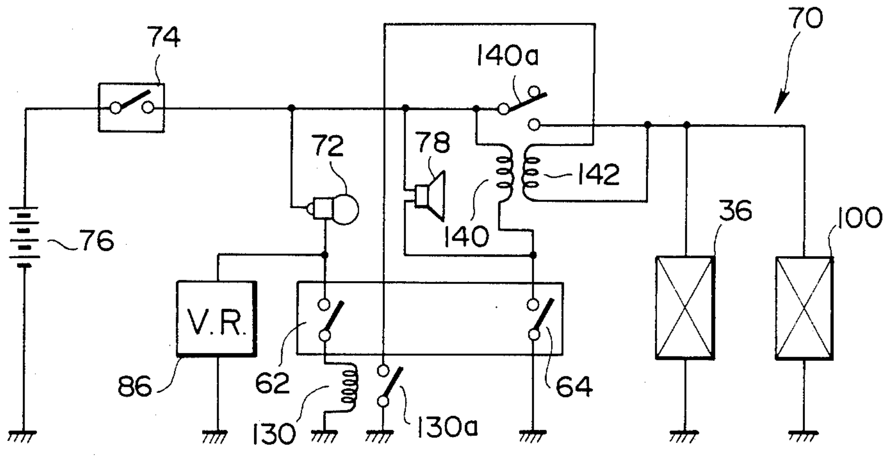
FIG. 7 is a circuit diagram showing the control circuit used with the fuel supply system of FIG. 5.

Referring to FIGS. 5–7, similar apparatus to that shown in FIGS. 1–4 has been illustrated and similar parts have been given the same reference numeral. In FIG. 5, fuel for the engine is delivered by the fuel injection pump 10 which draws fuel thereinto from the fuel tank 12 through the fuel line 14 in which the water separator 30 is positioned. The water separator 30 is effective to remove water from fuel prior to delivery to the fuel injection pump and is substantially the same as described in connection with FIG. 2. A fuel filter 90 is positioned in the fuel line 14 downstream of the water separator 30. The fuel filter 90 serves to prevent any contaminants from reaching the fuel injection pump 10. The fuel injection pump 10 delivers fuel under pressure to the fuel injectors 20 through which metered fuel is injected into the individual cylinders of the engine. Superfluous fuel is discharged from the fuel injection pump 10 into the return line 22 to which the injector spill ports are connected. The return line 22 extends into an auxiliary fuel tank 98 placed within the fuel tank 12. The auxiliary fuel tank 98 opens upwardly into the interior of the fuel tank 12 so that it is supplied with fuel from the return line 22 as well as fuel through its upper opening from the fuel tank 12. Thus, the fuel in the auxiliary fuel tank 98 includes no water. The fuel filter 90 carries thereon a three-way solenoid valve 100 which has a first inlet port 102 connected to the water separator outlet 48, a second outlet port 104 connected to the return passage 22 through a branch 92, and an outlet port 106 connected to the inlet of the fuel filter 90.

Referring to FIG. 6, the solenoid valve 100 has a plunger 110 placed for reciprocating movement within a bore into which the first and second inlet ports 102 and 104 and the outlet port 106 opens. The plunger 110 has an annular recess on its outer peripheral surface to define an annular passage 112 along with the bore inner surface, and an inner passage 114 opening at its one end into the annular passage 112 and at the other end into the outlet port 106. A spring 116 urges the plunger 110 to the left, as viewed in FIG. 6, against a stopper 118, in which position, the annular passage 112 is in registry with the first inlet port 102. An electrical winding 120 is electromagnetically coupled with the plunger 110. When the electrical winding 120 is energized, the plunger 110 moves rightward, as viewed in FIG. 6, to a position where the annular passage 112 is registry with the second inlet port 104.

Referring to FIG. 7, the lower reed switch 62 is connected to its negative terminal through a relay coil 130 to ground and at its positive terminal to the warning light 72 which is in turn connected through the main switch 74 to the voltage source 76. The relay coil 130 controls a relay controlled switch 130a which is closed when the relay coil 130 is energized. The upper reed switch 64 has a negative terminal connected to ground and a positive terminal connected to the warning buzzer 78 which is in turn connected to the voltage source 76 through the main switch 74. The warning buzzer 78 is connected in parallel with a relay coil 140 which controls a relay controlled switch 140a. When the relay coil 140 is energized, the switch contact 140a is closed to connect the drain valve 36 and the change-over valve 100 to the voltage source 76 through the main switch 74. The switch contact 140a is also controlled by a self-holding relay coil 142 which is connected at its one end to ground through the switch contact 130a and at the other end to the voltage source 76 through the switch contact 140a. When the self-holding relay coil 142 is energized, the switch contact 140a is closed. The voltage regulator 86 is connected to the junction of the lower reed switch 62 and the warning light 72.

The operation is as follows: Normally, fuel is delivered from the fuel tank 12 to the water separator 30 and hence through the fuel filter 90 to the fuel injection pump 10. Subsequently, metered fuel is injected through the fuel injectors 20 into the individual cylinders of the engine. Superfluous fuel from the fuel injection pump 10 and the fuel injectors 20 returns through the return line 22 to the auxiliary fuel tank 98. If the fuel level in the fuel tank 12 is higher than the upper end of the auxiliary fuel tank 98, fuel enters the auxiliary fuel tank 98 through its upper opening. Such fuel has no water since the auxiliary fuel tank 98 is too high to permit water to enter the auxiliary fuel tank even if water is stored in the fuel tank 12. If the auxiliary fuel tank 98 is full, fuel overflows through its upper opening into the fuel tank 12. The fuel returned through the return line 22 to the auxiliary fuel tank 98 includes no water since the water separator 30 has separated water from the fuel prior to the fuel delivery to the fuel injection pump 10.

Assuming now that the water level in the water separating chamber 40 is below the low level position, the lower and upper reed switches 62 and 64 are both open so that the warning light 72 and the warning buzzer 78 are held out of operation. Under this condition, the drain valve 36 is closed and the change-over valve 100 communicates the water separator 30 with the fuel filter 90.

When the water level in the water separating chamber 40 increases to the low level position, the float magnet 56 actuates and closes the lower reed switch 62 to actuate the warning light 72. The light indication is for urging the driver to drain the water from the water separating chamber 40 as soon as possible. Although, when the lower reed switch 62 is closed, the relay coil 130 is energized to close the switch contact 130a, this has no effect on the self-holding relay coil 142 since the switch contact 140a remains open. The driver may open the drain passage 50 manually to drain the water from the water separating chamber 40.

If the driver leaves the water in the water separating chamber 40 without draining it therefrom in spite of the warning indication or if a great amount of water, stored in the fuel tank 12, flows at one time into the water separating chamber 40, the water level in the water separating chamber 40 will increase to the high level position. This causes the float magnet 56 to actuate and close the upper reed switch 62. This in turn energizes the relay coil 140 so as to close the relay controlled switch 140a and thereby connect the drain valve 36 and the change-over valve 100 to the voltage source 76. Thus, the drain valve 36 opens to drain the water through the drain pipe 50 from the water separating chamber and at the same time the change-over valve 100 is actuated to move the plunger 110 against the force of the spring 116 to the position interrupting communication between the water separator 30 and the fuel filter 90 and providing communication between the return line 22 and the fuel filter 90. As a result, fuel, which is free of water, is drawn from the auxiliary fuel tank 98 through the fuel filter 90 to the fuel injection pump 10. Consequently, the engine can continue to operate on the fuel delivered from the auxiliary fuel tank 98. The amount of fuel possible to be delivered to the engine from the auxiliary fuel tank 98 is about 1 l even if the fuel level in the fuel tank 12 is lower than the upper end of the auxiliary fuel tank 98, the fuel amount being sufficient to permit the vehicle to run a distance of about 20 Km for passenger cars to a place suitable for water draining and fuel recharging. Simultaneously with the energization of the relay coil 140, the warning buzzer 78 is actuated to provide a sound indication of this state of the fuel supply circuit.

When the water level in the water separating chamber 40 falls due to the opening of the drain valve 36, the upper reed switch 62 opens again to disable that warning buzzer 78 and deenergize the relay coil 140 and the lower reed switch 64 closes to energize the relay coil 130. Upon such a change of the state of the control circuit, the switch contacts 140*a* and 130*a* are closed to energize the self-holding relay coil 142, thereby closing the switch contact 140*a*. The switch contact 140*a* remains closed to connect the drain valve 36 and the change-over valve 100 to the voltage source 76 until the water level in the water separating chamber 40 falls below the low level position.

When the water level in the water separating chamber 40 falls below the low level position, the lower reed switch 62 opens to deenergize the relay coil 130 so as to open the relay controlled switch 130*a* and thereby deenergize the self-holding relay coil 142. This causes the switch contact 140*a* to open so as to disconnect the drain valve 36 and the change-over valve 100 from the voltage source 76. Because of this, the drain valve 36 closes to terminate the water draining and the change-over valve 100 permits the plunger 110 to move, under the force of the spring 116, to the position providing communication between the water separator 30 and the fuel filter 90. As a result, the fuel supply circuit returns to its initial or normal state.

It is preferable to place a restriction orifice 122 in the second inlet port 104 for restricting the fuel flow from the return line 22 to the fuel filter 90. This is effective to limit the engine output power, thereby providing an indication to the driver of the water level in the water separating chamber 40 exceeding the high level position. It will be understood that the change-over valve 100 may be positioned in the fuel line 14 downstream of the water separator 30.

Figure 8:
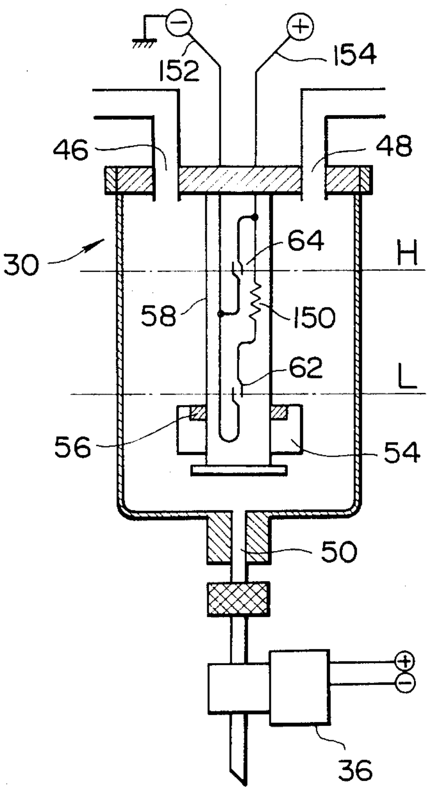
FIG. 8 is a sectional view showing a modified form of the water level sensor included in the water separator.

Referring to FIG. 8, there is illustrated a modified form of the water level sensor which is substantially similar to that of FIG. 2 except that the positive end of the lower reed switch 62 is connected through a resistor 150 to the negative end of the upper reed switch 64. In this case, the control circuit 70 is arranged to detect the low and high water levels in accordance with changes in the voltage across the negative and positive terminals 152 and 154.

Although the water level sensor has been described as including magnetically response lower and upper reed switches located within the water separating chamber in vertical alignment with each other and a magnetic float carried by the surface of the water in the water separating chamber, it is to be realized that there is no intention to be limited to such water level sensors. Other water level sensors, such for example as thermistor employed sensors and permittivity response sensors, may be used.

Although the present invention has been described in connection with a fuel-injection type internal combustion engine associated with a fuel supplier including a fuel injection pump and fuel injectors, it is to be realized that there is no intention to be limited to such a fuel supplier and other fuel suppliers, such for example as carburetors, may be used. In addition, although the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A fuel supply system including a fuel supply line extending from a fuel tank to a fuel supplier for delivery of fuel to an internal combustion engine; a fuel return line for returning superfluous fuel from said fuel supplier to said fuel tank; a water separator positioned in said fuel supply line, said water separator having a chamber in which fuel and water are separated into a lower phase comprising water and an upper phase comprising fuel, said water separator chamber having a water level sensor for sensing a first level of water and a second level of water higher than said first water level; and control means responsive to said water level sensor for providing a warning urging a driver to drain the water in said water separator chamber when the water level in said water separator chamber increases to said first level and for interrupting communication between said water separator and said fuel supplier when the water level in said water separator chamber increases to said second level.

2. The fuel supply system of claim 1, wherein said water level sensor includes magnetically response first and second reed switches located within said water separator chamber in vertical alignment with each other, and a magentic float carried by the surface of the water in said water separator chamber, said first reed switch being closed by said magnetic float when the water level in said water separator chamber increases to aid first level, said second reed switch being closed by said magnetic float when the water level in said water separator chamber increases to said second level.

3. The fuel supply system of claim 1, wherein said control means includes a shut-off valve located in said fuel supply line downstream of said water separator, said control means being responsive to said water level sensor for closing said shut-off valve when the water level in said water separator chamber increases to said second level.

4. The fuel supply system of claim 3, wherein said control means holds said shut-off valve closed until the water level in said water separator chamber falls below said first level.

5. The fuel supply system of claim 3, wherein said control means includes a drain valve, said control means being responsive to said water level sensor for opening said drain valve to drain the water in said water separator chamber when the water level in said water separator chamber increases to said second level.

6. The fuel supply system of claim 5, wherein said control means holds said drain valve open until the water level in said water separator chamber falls below said first level.

7. The fuel supply system of claim 1, wherein said control means is reponsive to said water level sensor for providing communication between said fuel return line and said fuel supplier when the water level in said water separator chamber increases to said second level.

8. The fuel supply system of claim 7, wherein said control means includes a restriction orifice through which fuel flows from said fuel return line to said fuel supplier.

9. The fuel supply system of claim 7 or 8, wherein said fuel return line extends into an auxiliary fuel tank placed within said fuel tank, said auxiliary fuel tank upwardly opening into the interior of said fuel tank.

10. The fuel supply system of claim 7 or 8, wherein said control means holds communication between said fuel return line and said fuel supplier until the water level in said water separator chamber falls below said first level.

11. The fuel supply system of claim 7, wherein said control means includes a drain valve, said control means being responsive to said water level sensor for opening said drain valve to drain the water in said water separator chamber when the water level in said water separator chamber increases to said second level.

12. The fuel supply system of claim 7, wherein said control means includes a change-over valve having a first inlet port connected to said water separator, a second inlet port connected to said fuel return line, and an outlet port connected to sasid fuel supplier, said change-over valve being normally in a first position communicating said outlet port with said first inlet port, said control means being responsive to said water level sensor for shifting said change-over valve from the first position to a second position communicating said outlet port with said second inlet port when the water level in said water separator chamber increases to said second level.

13. The fuel supply system of claim 12, wherein said control means includes a drain valve, said control means being responsive to said water level sensor for opening said drain valve to drain the water in said water separator chamber when the water level in said water separator chamber increases to said second level.

14. The fuel supply system of claim 12, wherein a restriction orifice is located in said second inlet port for restricting the fuel flow therethrough.

15. The fuel supply system of claim 14, wherein said control means includes a drain valve, said control means being responsive to said water level sensor for opening said drain valve to drain the water in said water separator chamber when the water level in said water separator chamber increases to said second level.

16. The fuel supply system of claim 11, 13, or 15, wherein said control means holds said drain valve open until the water level in said water separator chamber falls below said first level.

* * * * *